(12) United States Patent  (10) Patent No.: US 8,487,880 B2
Diederiks  (45) Date of Patent: Jul. 16, 2013

(54) PLACEMENT FOR INTERACTIVE DISPLAY TABLES

(75) Inventor: Elmo Marcus Attila Diederiks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 969 days.

(21) Appl. No.: 11/719,669

(22) PCT Filed: Nov. 21, 2005

(86) PCT No.: PCT/IB2005/053848
§ 371 (c)(1),
(2), (4) Date: May 18, 2007

(87) PCT Pub. No.: WO2006/056939
PCT Pub. Date: Jun. 1, 2006

(65) Prior Publication Data
US 2009/0174670 A1    Jul. 9, 2009

Related U.S. Application Data

(60) Provisional application No. 60/630,669, filed on Nov. 24, 2004, provisional application No. 60/724,600, filed on Oct. 7, 2005.

(51) Int. Cl.
*G06F 3/041* (2006.01)
(52) U.S. Cl.
USPC .......................................................... 345/173
(58) Field of Classification Search
USPC .......................................................... 345/173
See application file for complete search history.

(56) References Cited

U.S. PATENT DOCUMENTS

| | | | |
|---|---|---|---|
| 5,028,745 A | 7/1991 | Yamanami et al. | |
| 5,693,914 A | 12/1997 | Ogawa | |
| 5,831,614 A | 11/1998 | Tognazzini et al. | |
| 6,239,729 B1 | 5/2001 | Takeuchi | |
| 6,498,590 B1 * | 12/2002 | Dietz et al. | 343/893 |
| 6,504,649 B1 * | 1/2003 | Myers | 359/454 |
| 7,027,040 B2 * | 4/2006 | Rekimoto et al. | 345/173 |
| 7,030,782 B2 * | 4/2006 | Ely et al. | 341/20 |
| 2002/0163728 A1 | 11/2002 | Myers | |
| 2002/0163729 A1 | 11/2002 | Myers | |
| 2005/0245302 A1 | 11/2005 | Bathiche et al. | |

FOREIGN PATENT DOCUMENTS

| | | |
|---|---|---|
| JP | 10214068 A | 8/1998 |
| JP | 2000222133 A | 8/2000 |
| JP | 2000235443 | 8/2000 |
| JP | 2005031448 A | 2/2005 |
| WO | 0016863 | 3/2000 |

OTHER PUBLICATIONS

Hiroshi Ishii: "Bottles: A Transparent Interface as a Tribute to Mark Weiser", IEICE Transactions in INF and Systems, vol. E87-D, No. 6, Jun. 1, 2004, pp. 1299-1311, XP002382770.

(Continued)

*Primary Examiner* — Kevin M Nguyen

(57) ABSTRACT

A display table includes a location determination system that determines the location and orientation of each privacy overlay on the display table, and controls the display of private information accordingly. The overlays are portable sheets, akin to placemats, that can be positioned relatively arbitrarily about the display surface.

19 Claims, 1 Drawing Sheet

OTHER PUBLICATIONS

Robert J. K. Jacob et al; "A Tangible Interface for Organizing Information Using a Grid", Proc. of the SIGCHI Conf. on Human Factors in Computing Systems, Apr. 20, 2001, pp. 339-346, Minneapolis, Minnesota, XP002382771.

I. Ullmer et al, "The MetaDESK: Models and Prototypes for Tangible User Interfaces", 10th Annual Symposium on User Interface Software and Technology, Alberta, Canada, Oct. 14-17, 1997, pp. 223-232.

Display Table for Electronic Video Conferencing System, has Position Detectors Distributed Around Table, to Judge Participants Position, based on Which Stored Information is Displayed, Japanese Abstract 200235443 A.

* cited by examiner

PLACEMENT FOR INTERACTIVE DISPLAY TABLES

This invention relates to the field of electronics and display systems, and in particular to a placemat for use on an interactive display table that provides for private viewing of portions of the display through the place mat.

U.S. Pat. No. 6,504,649, "PRIVACY SCREENS AND STEREOSCOPIC EFFECTS DEVICES UTILIZING MICROPRISM SHEETS", issued 7 Jan. 2003, and incorporated by reference herein, discloses a privacy screen that prevents light from a display system from traveling in a given direction, and thereby prevents viewing of the image on the display from that direction. An example application of such a privacy screen is for use in a two-player game, wherein private information on each side of the display screen is blocked from the view of a person on the other side of the display screen. In this manner, information that is private to each player is kept from view from the other player.

U.S. published patent application 2002/0163728, "OPTICAL SHEETS OR OVERLAYS", published 7 Nov. 2002, provides a similar privacy sheet that can be configured to block viewing from a plurality of directions, and is incorporated by reference herein.

Japan published patent application 2000-235443, "ELECTRONIC CONFERENCING DEVICE, AND ITS CONTROL METHOD AND STORAGE MEDIUM", published 29 Aug. 2000, teaches a display table that detects where individuals are seated about the table, and displays information for each individual at their detected location, oriented properly for ease of viewing by the individual. The table also contains coordinate determination means for allowing each user to interact with the display table via an electronic pencil.

It is an object of this invention to integrate the use of privacy overlays with a display table. It is a further object of this invention to provide an easy-to-use and easy-to-configure multi-person gaming board.

These objects and others are achieved by a display table that includes a location determination system that determines the location and orientation of each privacy overlay on the display table, and controls the display of private information accordingly. Preferably, the overlays are portable sheets, akin to placemats, that can be positioned relatively arbitrarily about the display surface.

The invention is explained in further detail, and by way of example, with reference to the accompanying drawings wherein.

Throughout the drawings, the same reference numeral refers to the same element, or an element that performs substantially the same function. The drawings are included for illustrative purposes and are not intended to limit the scope of the invention.

Figure 1:
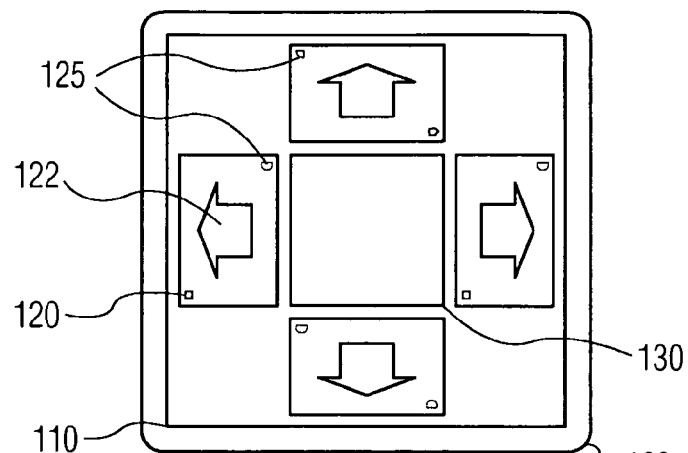
FIG. 1 illustrates an example display table with example placemats in accordance with this invention.

FIG. 1 illustrates an example display table 100 with a display 110 and example placemats 120 in accordance with this invention. Each of the placemats 120 has a private viewing direction 122, such that information that is displayed on the display 110 beneath the placemat 120 is obscured from views from directions opposing direction 122. The display 110 may also include one or more areas 130 that permit unrestricted viewing by all of the viewers at the table 100.

Figure 2:
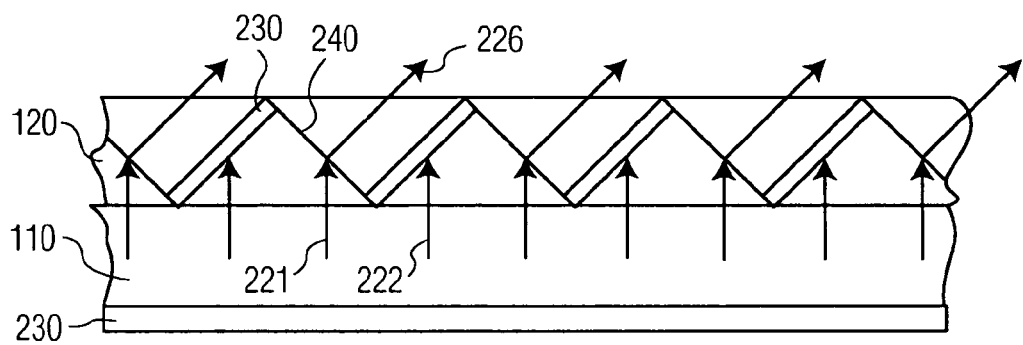
FIG. 2 illustrates an example placemat and display in accordance with this invention.

FIG. 2 illustrates an example technique for providing directional visibility to a display 110, via an overlay 120. The overlay 120 comprises a sheet of optical elements that affect the propagation of light beams 221, 222 from the display 110, as taught, for example in the above referenced U.S. Pat. No. 6,504,649 and USPA 2002/0163728. The overlay 120 includes optically blocking elements 250 that prevent the propagation of light beams 222 from the display 110, and surfaces 240 that deflect the light beams 221 in the indicated direction 226. Other means of projecting light from a display in a preferred direction, and preventing light from the display projecting in other directions via an overlay sheet upon the display may also be used in this invention.

In accordance with this invention, the display table 100 of FIG. 1 includes a location determination system (310 of FIG. 3) that detects the location of each placemat 120. Such a location determination system may include sensors in a layer 230 beneath the display 110, or other sensors, such as RF, IR, or other sensors mounted at the periphery of the display 110, sensors located on the surface of the display 110, or other location determination sensors. One of ordinary skill in the art will recognize these and other means for sensing the location of a placemat 120 on the display 110. For example, the placemat 120 may include objects 125 that detect row and column activation signals in the display 110, and the correlation between the time that the signals are sensed and the time that the row and column activation signals are applied can be used to determine the location of the sensors on the placemat. Alternatively, the objects 125 on the placemat 120 may be transmitters that transmit signals to sensors in the layer 230 or at other locations in the display 110. For example, the layer 230 may correspond to a conventional digitizer tablet that includes a grid of wires that are configured to detect currents from an electromagnetic coil in the placemat 120, or a grid of surface conductors that are configured to detect voltages from an electrostatic plate in the placemat 120.

Of particular note, U.S. Pat. No. 5,028,745, "POSITION DETECTING APPARATUS", issued 2 Jul. 1991, and incorporated by reference herein, discloses a grid of conductors that transmits a signal to a resonant circuit, then detects the oscillations that are reflected from the resonant circuit to the grid to determine the location of the resonant circuit relative to the grid. In like manner, U.S. Pat. No. 6,239,729, "POSITION DETECTING METHOD AND APPARATUS FOR DETECTING A PLURALITY OF POSITION INDICATORS", issued 29 May 2001, and incorporated by reference herein, discloses techniques for detecting multiple resonant circuits. Thus, by embodying a resonant circuit as the object 125, the location of the placemat 120 can be determined using conventional means as disclosed in these patents.

Similarly, the object 125 in the placemat 120 may be an RFID transmitter that responds to triggering signals from a transmitter controlled by the location determination system in the display table 100, and the time of arrival and/or magnitude of the response from the RFID transmitter at receivers of the location determination system can be used to determine the location of the RFID transmitter in the object 125. These and any of a variety of location determination systems and components may be used in this invention to determine the location of each placemat 120.

In yet another alternative embodiment, the object 125 may merely be a reference marker, and the aforementioned electromagnetic coil, electrostatic plate, RFID transmitter, or other location identifying component may be a portable device, such as a stylus or puck, that is external to the placemat 120, and used to transmit location-determining signals when placed at the reference marker(s) on the placemat 120.

Note that although the object 125 on the placemat 120 is illustrated as a one or more discrete elements at a fixed location on the placemat 120, for ease of understanding, one of ordinary skill in the art will recognize that any method or apparatus that serves to determine the location and orientation of the placemat 120 relative to the display 110 are suitable for use in this invention. For example, an optical system may be used to determine the location of each placemat 120, using, for example, a camera situated above the display 110, or opposing optical transmitter-detector pairs at the periphery of the display can be used to determine the extent of each placemat 120. Similarly, the aforementioned location-determining stylus can be used to trace the outline of each placemat 120.

Figure 3:
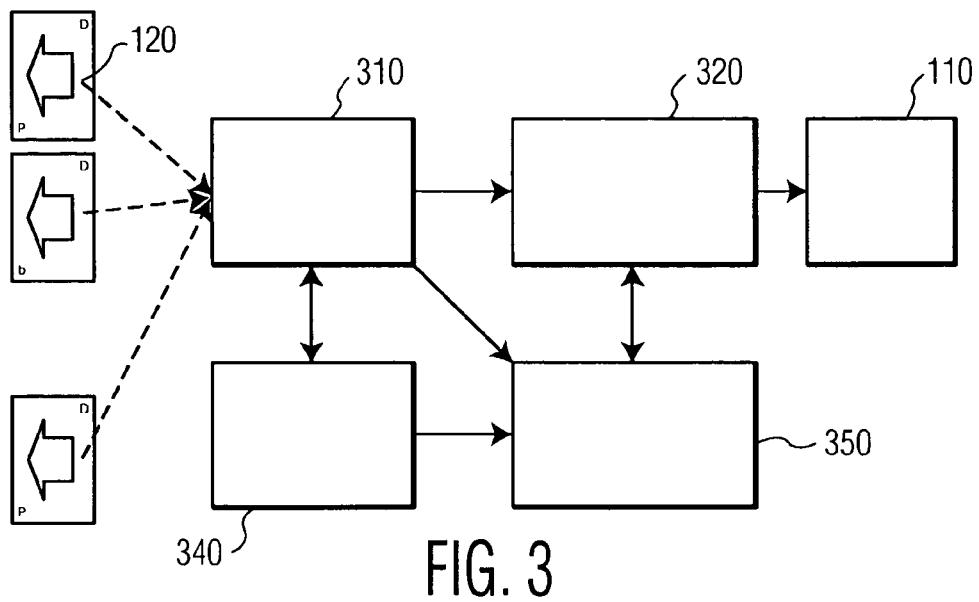
FIG. 3 illustrates an example block diagram of an interactive display table in accordance with this invention.

FIG. 3 illustrates an example block diagram of a display system in accordance with this invention. The display system includes a placemat detector 310 that is configured to determine the location of each placemat 120 on the display 110. To provide the intended privacy, the determination of the location includes a determination of the orientation of the placemat 310.

In a preferred embodiment, the location-identifying item includes an orientation-identifying feature. For example, if the item is an RFID transmitter, two RFID transmitters at different locations on the placemat can be configured to transmit different predefined identifiers, wherein the identifiers serve to identify a relative orientation. That is, one identifier may correspond to an item placed on the upper-left of the placemat 120, and the other to an item placed in the lower-right of the placemat 120. Alternatively, the orientation can have an assumed default value, such as toward the nearest edge of the display 110. Similarly, a separate user interface can be provided for the user to identify the orientation of each placemat. Other techniques for determining an orientation of the placemat will be evident to one of ordinary skill in the art in view of this disclosure.

The placemat detector 310 communicates the locations of the placemats 120 to a window controller 320 that is configured to create areas in the display 110 corresponding to each placemat 120, and to set a viewing-orientation of each area corresponding to the orientation of each placemat 120.

An application controller 350, such as a game controller, interacts with the window controller 320 to assign different user interface output ports to the different windows created by the controller 320. In a preferred embodiment that employs RFID transmitters on the placemats 120, unique identification signals are assigned to each placemat 120, and the placemat detector 310 communicates these identifiers to the application controller 350. In a game environment, for example, the placemats 120 may have color-coded trims, and the controller assigns a corresponding window to the red-player, the blue-player, and so on. Thereafter messages directed to the red-player are communicated to the window corresponding to the red-trimmed placemat. Alternatively, a user interface is provided by the controller 350 to assign player identifications to each placemat for routing messages to each player via the display area beneath the corresponding placemat.

An input detector 340 is also provided to enable users to interact with the application controller 350, and this same detector 340 is preferably used for the above referenced user interface to facilitate the determination of the location/orientation of the placemats 120, the mapping of each placemat 120 to a private display area, and so on.

As detailed above, each user of the display system of this invention is provided with a placemat 120. When the user positions his or her placemat 120 upon the display 110, the placement detector 310 detects the location and orientation of the placemat 120, optionally using user-provided auxiliary information via the input detector 340. The placement detector 310 informs the window controller 320 of the location/orientation of each placemat 120, and the window controller 320 allocates the area beneath each placemat 120 to each user. An application controller 350 thereafter directs information intended for each user to the area in the display beneath the user's placemat 120. Because the placemat 120 provides directional viewing of the light from the area beneath the placemat 120, each user is provided a private viewing of material directed to the user's placemat 120.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the invention is presented in the context of placemats having directional visibility for presenting private information, the principles of this invention can be applied regardless of the characteristics of the placemat, and regardless of the type of information being provided. Each placemat may contain, for example, an RFID device that identifies a particular user/owner of the placemat. When the user places his or her placemat on the display table, the system recognizes the user, and recognizes where the user is situated relative to the display table. Thereafter, information intended for the user can be presented on the display at the user's location, and, if the display system is interactive, input arriving from the user's location is attributed to the identified user. In like manner, merely knowing where each placemat is located and how it is oriented allows the system to display information in a corresponding area and in a proper orientation, regardless of whether there is a need to keep the displayed information private. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements.

The invention claimed is:

1. A system comprising:
a display;
a portable placemat that is placed at a location on the display;
a placemat detector that is configured to determine the location of the portable placemat on the display;

a window controller that is configured to partition the display into a plurality of display areas based on the location determined by the placemat detector, the plurality of display areas including a first user area and a second user area, the first user area corresponding to the location of the portable placemat on the display determined by the placemat detector for allowing a first user of the portable placemat located at a first direction from the portable placemat to view first information displayed on the first user area and for blocking view of the first information at the second user area at directions other than the first direction from the portable placemat; and an application controller that is configured to assign the first user area to the first user and the second user area to a second user, and based on the location determined by the placemat detector to selectively route the first information intended for the first user to the first user area and second information intended for the second user to the second user area.

2. The system of claim 1, wherein
the portable placemat is configured to provide directional visibility of information displayed in the user area.

3. The system of claim 2, wherein
the portable placemat includes one or more resonant circuits that facilitate determining the location of the portable placemat.

4. The system of claim 1, wherein
the portable placemat includes one or more resonant circuits that facilitate determining the location of the portable placemat.

5. The system of claim 1, wherein
the portable placemat includes one or more RFID transmitters.

6. The system of claim 1, wherein
the placemat detector includes a layer of elements coincident with the display that facilitate the detection of the portable placemat on the display.

7. The system of claim 1, further including
a portable device, operably coupled to the placemat detector, that facilitates detection of the portable placemat on the display.

8. The system of claim 1, wherein
the placemat detector includes a plurality of sensing elements at a periphery of the display that facilitate detection of the portable placemat on the display.

9. The system of claim 1, wherein
the placemat detector includes one or more optical elements that facilitate detection of the portable placemat on the display.

10. A placemat for overlaying a display surface, comprising:

an area that permits viewing of images below the placemat at a first portion of the display surface when viewed from a first direction and blocks the viewing when viewed from a second direction;

one or more locating elements that facilitate detection of a location of the placemat relative to the display surface; and a controller that is configured to assign the first portion to a first user and a second portion of the display surface to a second user, and based on the location determined by the placemat detector to selectively route first information intended for the first user to the first portion and second information intended for the second user to the second portion.

11. The placemat of claim 10, wherein
the one or more locating elements include a resonant circuit.

12. The placemat of claim 10, wherein
the one or more locating elements include an RFID device.

13. The placemat of claim 10, wherein
the one or more locating elements are arranged on the placemat to facilitate a determination of an orientation of the placemat.

14. The placemat of claim 10, further including
a layer of optical elements that provides a directional visibility of the images below the placemat.

15. The placemat of claim 14, wherein
the one or more locating elements include a resonant circuit.

16. The placemat of claim 14, wherein
the one or more locating elements include an RFID device.

17. The placemat of claim 14, wherein
the one or more locating elements are arranged on the placemat to facilitate a determination of an orientation of the directional visibility of the layer of optical elements.

18. A method of displaying images on a display surface, comprising the acts of:

determining a location of a placemat on the display surface;

displaying the images in first area of the display surface corresponding to the location of the placemat at a first direction from the placemat while blocking view of the images at a second area of the display surface at directions other than the first direction from the portable placemat; and assigning the first area to a first user of the placemat and the second area to a second user, and based on the location determined by the placemat detector to selectively route first information intended for the first user to the first area and second information intended for the second user to the second area.

19. The method of claim 18, further including:

determining an orientation of the placemat on the display surface, and displaying the images based on the orientation of the placemat.

* * * * *